US012544581B2

(12) United States Patent
Xu

(10) Patent No.: US 12,544,581 B2
(45) Date of Patent: Feb. 10, 2026

(54) CAPACITIVE COUPLING ENERGY TRANSMISSION NERVE ELECTROSTIMULATION SYSTEM, IN-VIVO NERVE ELECTROSTIMULATOR THEREOF, AND INVITRO ENERGY CONTROLLER THEREOF

(71) Applicant: Beijing Leading Innovation Medical Valley Co., Ltd, Beijing (CN)

(72) Inventor: Tianrui Xu, Beijing (CN)

(73) Assignee: BEIJING LEADING INNOVATION MEDICAL VALLEY CO., LTD., Beijing (CN)

( * ) Notice: Subject to any disclaimer, the term of this patent is extended or adjusted under 35 U.S.C. 154(b) by 0 days.

(21) Appl. No.: 18/730,649

(22) PCT Filed: Jan. 3, 2023

(86) PCT No.: PCT/CN2023/070095
§ 371 (c)(1),
(2) Date: Jul. 19, 2024

(87) PCT Pub. No.: WO2023/185180
PCT Pub. Date: Oct. 5, 2023

(65) Prior Publication Data

US 2025/0161695 A1 May 22, 2025

(30) Foreign Application Priority Data

Mar. 28, 2022 (CN) ......................... 202210315229.9

(51) Int. Cl.
*A61N 1/378* (2006.01)
*A61N 1/372* (2006.01)
*H02J 50/12* (2016.01)

(52) U.S. Cl.
CPC ....... *A61N 1/3787* (2013.01); *A61N 1/37247* (2013.01); *H02J 50/12* (2016.02)

(58) Field of Classification Search
CPC .............. A61N 1/3787; A61N 1/37247; A61N 1/3605; A61N 1/36125; A61N 1/36128; A61N 1/37223; H02J 50/12
See application file for complete search history.

(56) References Cited

U.S. PATENT DOCUMENTS 4,102,344 A * 7/1978 Conway ............ A61N 1/36007 607/66
6,035,237 A * 3/2000 Schulman .......... A61N 1/36142 607/57

(Continued)

FOREIGN PATENT DOCUMENTS

CN 109603007 A * 4/2019 ......... A61N 1/37223
CN 11167012 A 5/2020

(Continued)

*Primary Examiner* — Rexford N Barnie
*Assistant Examiner* — Michael J Warmflash
(74) *Attorney, Agent, or Firm* — Polsinelli PC

(57) ABSTRACT

A nerve electrostimulation system using capacitive coupling energy transmission, in-vivo nerve electrostimulator, and in-vitro energy controller thereof. The nerve electrostimulation system using capacitive coupling energy transmission includes an in-vivo nerve electrostimulator and an in-vitro energy controller, and may also include a program controller having an upper computer control APP. The in-vivo nerve electrostimulator includes at least one stimulator coupling capacitor pole, a stimulator compensation resonant network, a rectification circuit, a filter capacitor, a main control chip, a stimulator harmonic communication module, and a plurality of sets of stimulation electrodes and corresponding balance capacitors, wherein the stimulator coupling capacitor pole is coupled with an energy controller coupling capacitor pole of the in-vitro energy controller, thereby (Continued)

receiving electrical energy from the in-vitro energy controller and achieving information exchange. The nerve electrostimulation system using capacitive coupling energy transmission can increase the electrical power to be transmitted.

17 Claims, 13 Drawing Sheets

(56) References Cited

U.S. PATENT DOCUMENTS

| | | | | |
|---|---|---|---|---|
| 7,650,186 | B2 * | 1/2010 | Hastings | A61N 1/0587 607/32 |
| 11,167,012 | B2 * | 11/2021 | Ackerman | C07K 14/521 |
| 11,327,460 | B2 * | 5/2022 | Kondou | G05B 19/4083 |
| 2006/0241732 | A1 * | 10/2006 | Denker | A61N 1/3787 607/116 |
| 2007/0027508 | A1 * | 2/2007 | Cowan | A61N 1/362 607/9 |
| 2007/0075905 | A1 * | 4/2007 | Denker | A61N 1/37229 128/903 |
| 2008/0039904 | A1 * | 2/2008 | Bulkes | A61N 1/37512 607/116 |
| 2008/0091248 | A1 * | 4/2008 | Libbus | A61N 1/36034 607/2 |
| 2010/0241195 | A1 * | 9/2010 | Meadows | A61N 1/3787 607/2 |
| 2012/0290038 | A1 * | 11/2012 | Moffitt | A61N 1/36142 607/45 |
| 2013/0123882 | A1 * | 5/2013 | Towe | A61N 1/37205 29/601 |
| 2016/0144183 | A1 * | 5/2016 | Marnfeldt | A61N 1/3605 607/63 |
| 2017/0143969 | A1 * | 5/2017 | Sarpeshkar | A61N 1/36071 |
| 2017/0189673 | A1 * | 7/2017 | Parramon | A61N 1/37205 |
| 2017/0310163 | A1 * | 10/2017 | Ghovanloo | A01K 29/005 |
| 2019/0269399 | A1 * | 9/2019 | Mashiach | H04B 5/79 |
| 2020/0108271 | A1 * | 4/2020 | Shyu | A61N 5/0601 |
| 2020/0376275 | A1 * | 12/2020 | Perryman | H02J 50/23 |
| 2021/0244948 | A1 * | 8/2021 | DeShazo | A61N 1/3614 |
| 2024/0042218 | A1 * | 2/2024 | Xu | A61N 1/3787 |

FOREIGN PATENT DOCUMENTS

| | | | | | |
|---|---|---|---|---|---|
| CN | 112972895 | A | | 6/2021 | |
| CN | 11327460 | A | | 8/2021 | |
| CN | 113274640 | A | * | 8/2021 | A61N 1/3605 |
| CN | 114768092 | A | | 7/2022 | |
| CN | 217697661 | U | | 11/2022 | |

* cited by examiner in-vitro energy controller 02 in-vivo nerve electrostimulator 03

CAPACITIVE COUPLING ENERGY TRANSMISSION NERVE ELECTROSTIMULATION SYSTEM, IN-VIVO NERVE ELECTROSTIMULATOR THEREOF, AND INVITRO ENERGY CONTROLLER THEREOF

TECHNICAL FIELD

The present invention relates to a nerve electrostimulation system of transcutaneous non-contact energy transmission.

BACKGROUND ART

Unlike implantable battery power supply, the transcutaneous energy transmission system (TETS) is to transmit an extraneous energy source through the human skin to an in-vivo implanted device by way of magnetic fields and electromagnetic induction. According to different working frequencies and power levels, the transcutaneous energy transmission method currently used in human implantable devices can be divided into two categories: radio frequency energy transmission and non-contact transformer based TETS.

In-vitro radio frequency power supply technology is currently widely used for energy and data transmission in human implanted devices, which provides electrical energy from in vitro to in vivo, or directly supply power to in-vivo electrical circuits, or charge in-vivo rechargeable batteries through electromagnetic induction of radio frequency and magnetic field coupling. In recent years, due to increasing complexity of implanted electronic systems, the power consumption of in-vivo electronic systems has also been increasing. Due to limitations of its own topology, the radio frequency power supply technology cannot achieve the electrical energy supply for high-power implanted devices such as artificial hearts.

For example, Chinese patent CN103796715B discloses a neural stimulator system that uses an in-vitro controller to directly transmit electrical energy to an in-vivo implanted part through an RF antenna. Due to the aforementioned limitations, this system has a short transmission distance (<6 cm), and its transmission power is limited by the battery capacity of the in-vitro controller.

To solve the above problems, the transcutaneous energy transmission using non-contact transformers continues to increase. Similar to the principle of radio frequency energy transmission, both use the principle of electromagnetic induction to achieve electromagnetic conversion, magneto-electric conversion, and non-contact transmission of energy. The difference is that this new type of induced electrical energy transmission utilizes a non-contact transformer having large air gaps between the primary and secondary sides as the key link for energy transmission, in which the secondary side of the transformer is implanted inside the human body, and the primary side of the transformer located outside the body facing to the secondary side, transmitting electrical energy through skin through electromagnetic induction in the form of a magnetic field to the in-vivo implanted device. Compared to the RF electrical energy transmission mentioned above, this system has a relatively low operation frequency. Due to large leakage inductance of the separated transformer, the energy transmission efficiency of the system is adversely affected.

The information disclosed in the background section of the present invention is only intended to increase an understanding of the overall background of the present invention, and should not be regarded as acknowledging or implying in any form that the information constitutes the prior art that is already well-known to those skilled in the art.

SUMMARY OF THE INVENTION

The invention aims to propose an implantable nerve electrostimulator system based on capacitive coupling for energy transmission. Compared to an implantable nerve electrostimulator system that transmits energy through radio frequency or transformers, the capacitive coupling electrical energy transmission of the present invention can transmit higher electrical power.

The present invention provides an in-vivo nerve electrostimulator comprising: at least one stimulator coupling capacitor pole for coupling with an energy controller coupling capacitor pole of an in-vitro energy controller, thereby receiving electrical energy from the in-vitro energy controller and achieving information exchange; a stimulator compensation resonant network connected to the stimulator coupling capacitor pole to compensate for reactive power of the received electrical energy; a rectification circuit connected to the stimulator compensation resonant network and converting alternating current energy that has been compensated by a compensation couple into direct current energy; a filter capacitor connected to the rectification circuit to perform direct current filtering on the rectified direct current energy; a main control chip that controls operation of the in-vivo nerve electrostimulator, connected to the rectification circuit and the filter capacitor for receiving power supply therefrom; a stimulator harmonic communication module connected between the stimulator coupling capacitor pole and the main control chip for modulating and demodulating communication information; a plurality of sets of stimulation electrodes and corresponding balance capacitors, wherein each balance capacitor is connected between the main control chip and a corresponding stimulation electrode, receives stimulation pulses from the main control chip and applies them to the corresponding stimulation electrode, and achieves charge balance.

In the above in-vivo nerve electrostimulator, preferably it comprises two stimulator coupling capacitor poles, wherein the stimulator compensation resonant network is formed as follow: one of the two stimulator coupling capacitor poles is connected to the rectification circuit through a stimulator compensation inductor, and the other one of the two stimulator coupling capacitor poles is directly connected to the rectification circuit.

In the above in-vivo nerve electrostimulator, preferably the stimulator harmonic communication module comprises a filter circuit sensitive to A-th harmonic, thereby extracting information from the A-th harmonic of the received signal and transmitting the information to the main control chip. Further preferably, the stimulator harmonic communication module also comprises a filter circuit sensitive to B-th harmonic, thereby extracting the B-th harmonic from the received signal, and the main control chip controls the stimulator harmonic communication module to modulate impedance of the B-th harmonic, and the impedance modulated data is transmitted to the in-vitro energy controller by the stimulator coupling capacitor pole. Optionally, wherein B may be equal to A.

The present invention also provides an in-vitro energy controller for transmitting electrical energy to and communicating with an in-vivo nerve electrostimulator, comprising: a battery module for supplying power to the in-vitro energy controller; an energy controller control unit for controlling the operation of the in-vitro energy controller; an upper computer communication module connected to the energy controller control unit which communicates with a program controller through the upper computer communication module; a storage module for storing electrical stimulation signals and connected to the energy controller control unit; an inverter module connected to the battery module and the energy controller control unit for converting direct current supplied by the battery module into alternating current; an energy controller compensation resonant network connected to the inverter module to compensate for reactive power of the system, at least one energy controller coupling capacitor pole connected to an output end of the energy controller compensation resonant network; an energy controller harmonic communication module powered by the battery module and bridged between the energy controller control unit and the energy controller coupling capacitor pole for modulating and demodulating communication information; and a button and display module comprising a button for inputting an operation instruction and a display screen for displaying input content and information about operation of the in-vivo nerve electrostimulator.

In the above in-vitro energy controller, preferably it comprises two energy controller coupling capacitor poles, wherein the energy controller compensation resonant network forms a serial inductance compensation network as follow: one of the two energy controller coupling capacitor poles is connected to the inverter module through a first energy controller compensation inductor, and the other one of the two energy controller coupling capacitor poles is directly connected to the inverter module.

In the above in-vitro energy controller, preferably it comprises two energy controller coupling capacitor poles, wherein the energy controller compensation resonant network forms an LCL compensation network topology as follow: one of the two energy controller coupling capacitor poles is connected in series to the inverter module through one first energy controller compensation inductor and another first energy controller compensation inductor; the other one of the two energy controller coupling capacitor poles is directly connected to the inverter module to form a connection point, which is connected to a common connection end of the one first energy controller compensation inductor and the another first energy controller compensation inductor through a first energy controller compensation capacitor.

In the above in-vitro energy controller, preferably it comprises two energy controller coupling capacitor poles, wherein the energy controller compensation resonant network forms a compensation resonant network structure having a relay coil as follow: comprising a primary winding having one end connected to a first output end of the inverter module and the other end connected to a second output end of the inverter module through a second energy controller compensation capacitor; and a secondary winding having one end connected to one of the energy controller coupling capacitor poles and the other end connected to the other one of the energy controller coupling capacitor poles.

In the above in-vitro energy controller, preferably the energy controller control unit controls the energy controller harmonic communication module to generate an A-th harmonic equivalent to A times of the output frequency of the inverter module, and modulates information into the A-th harmonic. Further preferably, the energy controller control unit controls the energy controller harmonic communication module to generate a B-th harmonic equivalent to B times of the output frequency of the inverter module, and transmits the harmonic to the pole. Optionally, wherein B can be equal to A.

In the above in-vitro energy controller, preferably the upper computer communication module is a Bluetooth module or a WiFi module.

The present invention also provides a nerve electrostimulation system using capacitive coupling energy transmission comprising the in-vivo nerve electrostimulator and the in-vitro energy controller.

In the above nerve electrostimulation system using capacitive coupling energy transmission, preferably it further comprises a program controller which has a program controller communication module for communicating with the in-vitro energy controller and an upper computer control APP for achieving human-machine interaction control to the in-vitro energy controller and the in-vivo nerve electrostimulator.

In the above nerve electrostimulation system using capacitive coupling energy transmission, preferably the program controller communication module is a Bluetooth module or a WiFi module.

According to the implantable nerve electrostimulator system of the present invention, due to use of capacitive coupling for electric energy transmission, it can transmit greater electrical power, thereby expanding its applicability.

The methods and devices of the present invention have other characteristics and advantages that will be apparent from the accompanying drawings and subsequent specific embodiments incorporated herein, or will be described in detail in the accompanying drawings and subsequent specific embodiments, which together serve to explain the specific principles of the present invention.

Figure 1:
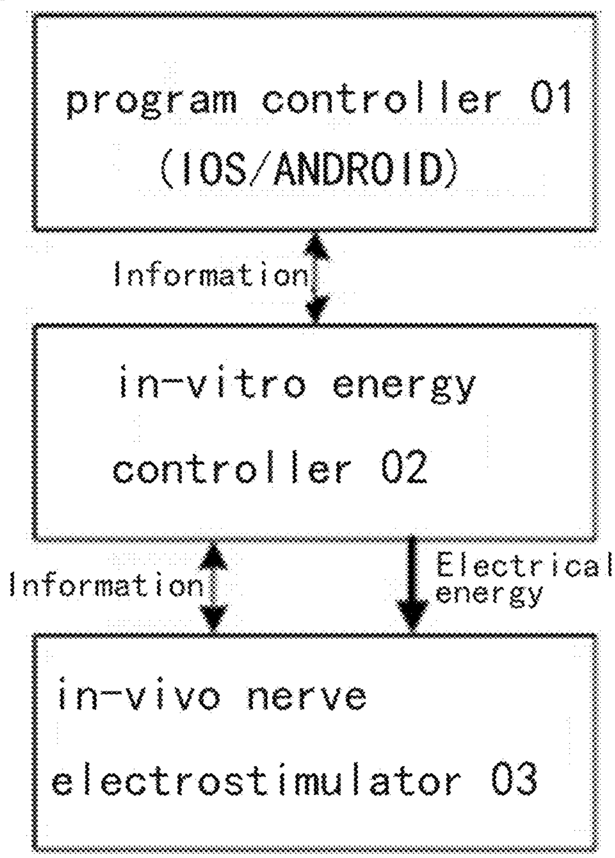
FIG. 1 shows a functional block diagram of a nerve electrostimulator system.

It should be understood that the accompanying drawings do not necessarily have to be drawn to scale, as they illustrate various features of the basic principles of the present invention that have been simplified to some extent. The specific design features of the present invention disclosed herein, including specific dimensions, orientation, positioning, and appearance, will be partially determined by the application and usage environment for the specific purpose.

In these drawings, in multiple figures running through the drawings, the reference numerals refer to the same or equivalent parts of the present invention.

LIST OF REFERENCE NUMERALS

01 program controller
02 in-vitro energy controller
201 energy controller control unit
202 Bluetooth module
203 storage module
204 inverter module
205 energy controller harmonic communication module
206 battery module
207 energy controller coupling capacitor pole
208 energy controller compensation resonant network
209 button and display module
210 WiFi module
03 in-vivo nerve electrostimulator
301 stimulator coupling capacitor pole
302 rectification circuit
303 stimulator harmonic communication module
304 filter capacitor
305 stimulator compensation resonant network
306 main control chip
307 stimulation electrode
308 balance capacitor.

DETAILED DESCRIPTION OF EMBODIMENTS

Now, specific reference will be made to the various embodiments of the present invention, and examples of these embodiments are shown in the accompanying drawings and the following description. This exemplary embodiments are just examples and can be implemented in various forms by those skilled in the art. Therefore, the present invention is not limited to the exemplary embodiments described herein.

As shown in FIG. 1, the nerve electrostimulation system using capacitive coupling energy transmission of the present invention comprises three parts: a program controller 01 installed with a hardware carrier of an upper computer APP (for example, a hardware carried with an IOS system, such as an iPad, etc.), an in-vitro energy controller 02, and an in-vivo nerve electrostimulator 03. The program controller 01 can communicate with the in-vitro energy controller 02 through a Bluetooth module or an optional WiFi module. The in-vitro energy controller 02 communicates with the in-vivo nerve electrostimulator 03 through a harmonic communication module or a Bluetooth module. The in-vivo nerve electrostimulator 03 obtains electrical energy from the in-vitro energy controller 02 in the form of capacitive coupling.

As a main information exchange platform, the program controller 01 and its APP can achieve all functions such as controlling, debugging programs, querying patient related information, and configuring the in-vivo nerve electrostimulator 03. Doctors can manage patient information, set treatment schemes, adjust parameter configurations, and view relevant data recorded during the electrostimulation treatment process through the program controller 01.

Figure 2:
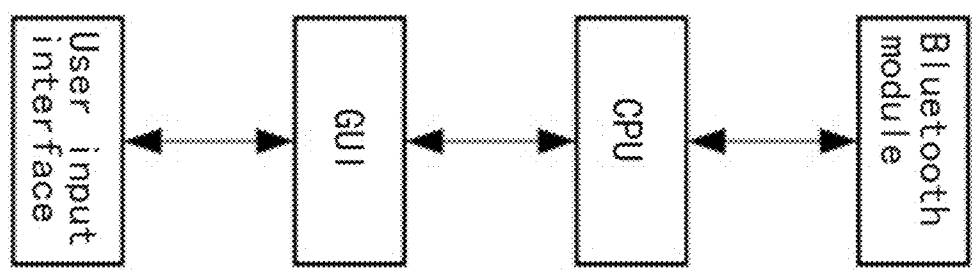
FIG. 2 shows a functional block diagram of a program controller.

The program controller 01 shown in FIG. 2 is provided with a Bluetooth module. At this point, the program controller 01 communicates with the in-vitro energy controller 02 through Bluetooth protocol.

In addition, a WiFi module can be integrated into the in-vitro energy controller, which enables doctors to remotely view patient data and adjust treatment schemes. The WiFi module can be an optional accessory, which is designated by the patient to be configured or not.

The in-vitro energy controller 02 is a relay part that enables data transmission, control, debugging, and other functions between the program controller 01 and the in-vivo nerve electrostimulator 03; meanwhile, it is also a main part that supplies power for in-vivo devices.

Figure 3:
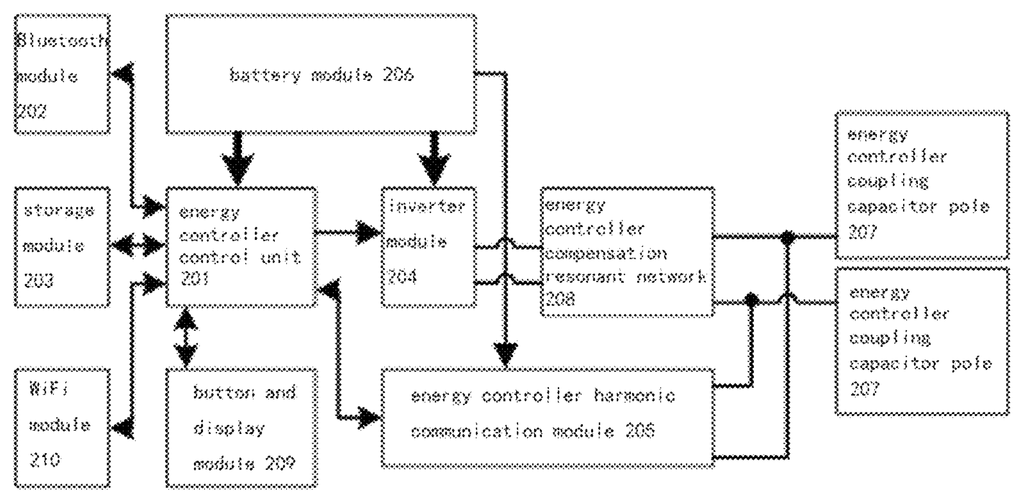
FIG. 3 shows a functional block diagram of an in-vitro energy controller.

As shown in FIG. 3, the in-vitro energy controller 02 includes an energy controller control unit 201, a Bluetooth module 202, a storage module 203, an inverter module 204, an energy controller harmonic communication module 205, a battery module 206, and at least one energy controller coupling capacitor pole 207, an energy controller compensation resonant network 208, and a button and display module 209. A WiFi module 210 can also be optionally equipped, as shown in FIG. 3.

The in-vitro energy controller 02 communicates with the program controller 01 through the Bluetooth module 202, and configures internal register data according to the information obtained from the program controller 01. All parameters of the electrostimulation signal to be generated are stored in the storage module 203 (non-volatile memory can be used), and can be reliably stored for a long time.

At the same time, the in-vitro energy controller 02 converts direct current of a battery pack into high-frequency alternating current through the inverter module 204, which is transmitted to the energy controller coupling capacitor pole 207 after being adjusted by the energy controller compensation resonant network 208 in order to supply power to the in-vivo nerve electrostimulator 03. The main control chip uses the second or higher-order harmonics of high-frequency alternating current generated by the inverter module 204 for information modulation and demodulation, and communicates with the in-vivo energy controller through the energy controller harmonic communication module 205.

That is, in the in-vitro energy controller, the inverter circuit converts direct current into alternating current, which is composed of harmonics of different orders, with the fundamental wave having the highest energy and used for electrical energy transmission. In addition to the fundamental wave, the filter circuit also extracts the A-th and B-th harmonics. The A-th harmonic is used to transmit information data to the inside of body, while the B-th harmonic is used to transmit data from the inside to the outside of body.

Figure 4:
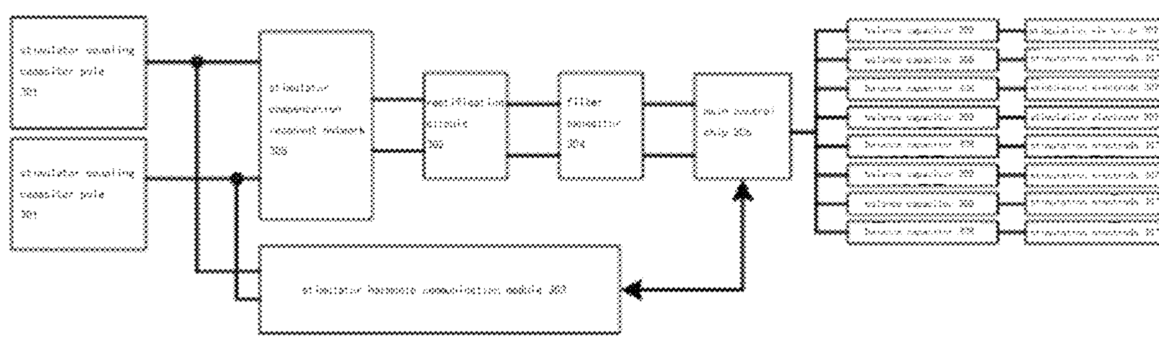
FIG. 4 shows a functional block diagram of an in-vivo nerve electrostimulator.

The in-vivo nerve electrostimulator 03 includes at least one stimulator coupling capacitor pole 301 for receiving electrical energy of the in-vitro energy controller, as well as a rectification circuit 302, a stimulator harmonic communication module 303, a filter capacitor 304, a stimulator compensation resonant network 305 and other discrete elements connected thereto. In addition, it also includes a main control chip 306 and several sets of stimulation electrodes 307 and balance capacitors 308 to achieve electrostimulation function, as shown in FIG. 4.

In addition, due to the capacitive coupling way being able to transmit more electrical energy, the in-vivo nerve electrostimulator 03 can also be equipped with a Bluetooth module. In this case, the in-vitro energy controller can also communicate in real-time bilaterally with the in-vivo nerve electrostimulator 03 through Bluetooth.

The stimulator coupling capacitor pole 301 obtains electrical energy from the energy controller coupling capacitor pole 207 of the in-vitro energy controller in the way of capacitive coupling, and compensates for reactive power through the stimulator compensation resonant network 305. The alternating current energy is converted into direct current energy through a rectification circuit 302, which is filtered through the filter capacitor 304 for direct current filtering. This capacitor can also store a small amount of electrical energy. The direct current energy having been rectified and filtered is supplied to the main control chip 306 for use. In addition, the stimulator harmonic communication module 303 is connected to the stimulator capacitor pole 301 to achieve functions of modulating and demodulating the harmonic signals. And the data is exchanged with the main control chip.

The stimulation electrode 307 is a main executing component of nerve electrostimulation, which implements electric pulse stimulation on the nerves. The function of the balance capacitor 308 is to ensure that the static charge of each electrode 307 is zero during the implementation of nerve electrostimulation, achieving charge balance.

Figure 5:
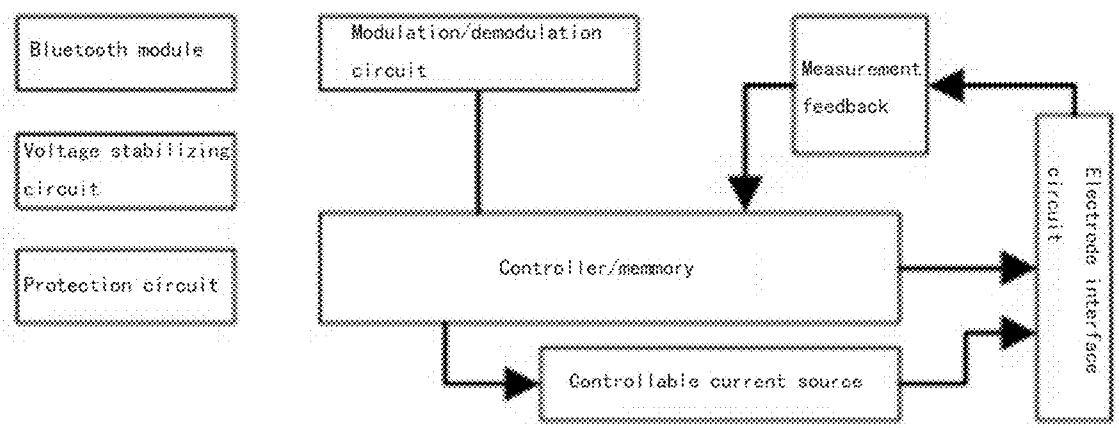
FIG. 5 shows a block diagram of a main control chip of an in-vivo nerve electrostimulator.

The main control chip 306 can achieve functions such as configuration information storage, data calculation, and controlling generation of electrostimulation pulses, which is a main control component for achieving in-vivo electrostimulation functions. The main control chip 306 can also integrate with a Bluetooth module, which replaces the harmonic communication module. The internal block diagram of the main control chip 306 is shown in FIG. 5.

The main control chip 306 is internally configured with a controller, a memory, a controllable current source, an electrode interface circuit, a measurement feedback circuit, and a modulation and demodulation circuit. In addition, a voltage stabilizing circuit and an overcurrent protection circuit are also configured at the power supply end to ensure that the power supply voltage does not exceed the warning voltage value, thereby protecting the main control chip 306. The memory can use a non-volatile memory to achieve power-off storage and to reliably store the relevant set parameters of electrostimulation pulses for a long time. The chip can be optionally equipped with a Bluetooth module internally to support the Bluetooth communication protocol.

The main control chip 306 controls the controllable current source circuit through a controller to generate the required current pulse stimulation signal, and transmits the pulse to the designated electrode through an electrode interface circuit.

Figure 6:
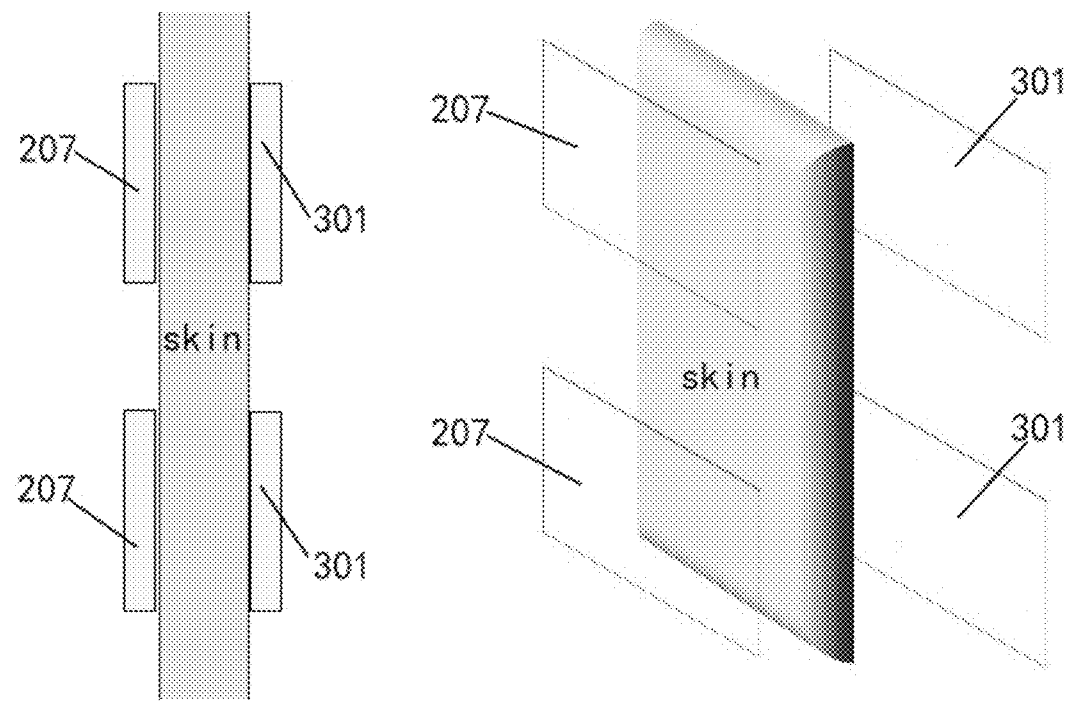
FIG. 6 shows a schematic diagram of implementation of a capacitive coupling capacitor pole.

FIG. 6 is a schematic diagram of implementation of the energy controller coupling capacitor pole 207 and the stimulator coupling capacitor pole 301. As shown in FIG. 6, when in use, the energy controller coupling capacitor pole 207 of the in-vitro energy controller 02 and the stimulator coupling capacitor pole 301 of the in-vivo nerve electrostimulator 03 are respectively provided on the outer and inner sides of the patient's skin.

The following provides a detailed explanation of operation of the nerve electrostimulation system using capacitive coupling energy transmission of the present invention.

Electrical Energy Transmission Procedure

The electrical energy transmission is mainly controlled by the in-vitro energy controller 02, and the battery module 206 in the in-vitro energy controller 02 is a main electrical energy storage component. The energy controller control unit 201 controls the inverter module 204 to invert direct current energy provided by the battery module 206 into high-frequency alternating current, with a frequency ranging from 1 MHz to 40 MHz. Due to the capacitive coupling between the energy controller coupling capacitor pole 207 and the stimulator coupling capacitor pole 301, there is a relatively large equivalent serial capacitance. Therefore, in order to compensate for the reactive power of the system, an energy controller compensation resonant network 208 and a stimulator compensation resonant network 305 are added. For the stimulator compensation resonant network 305 of the in-vivo implanted part, simple serial inductance compensation or no compensation can be used due to the need of considering factors such as magnetic resonance compatibility and volume.

However, there may be a plurality of optional implementation schemes for the energy controller compensation resonant network 208 of the in-vitro energy controller portion.

Figure 7:
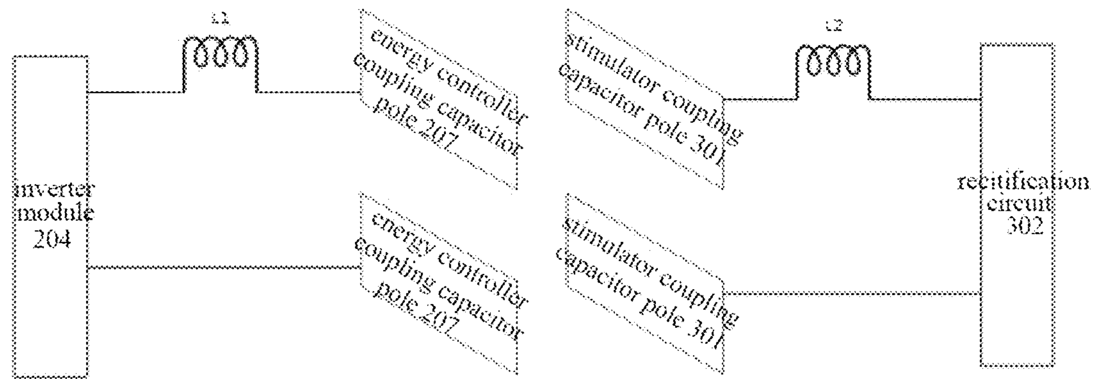
FIG. 7 shows a first embodiment of a compensation resonant network.

Scheme 1 is the simplest serial inductance compensation, as shown in FIG. 7.

Figure 8:
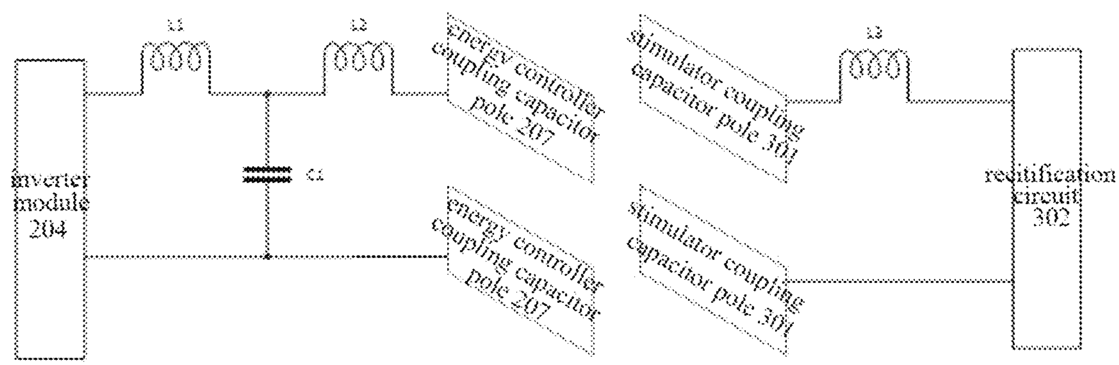
FIG. 8 shows a second embodiment of a compensation resonant network.
Figure 9:
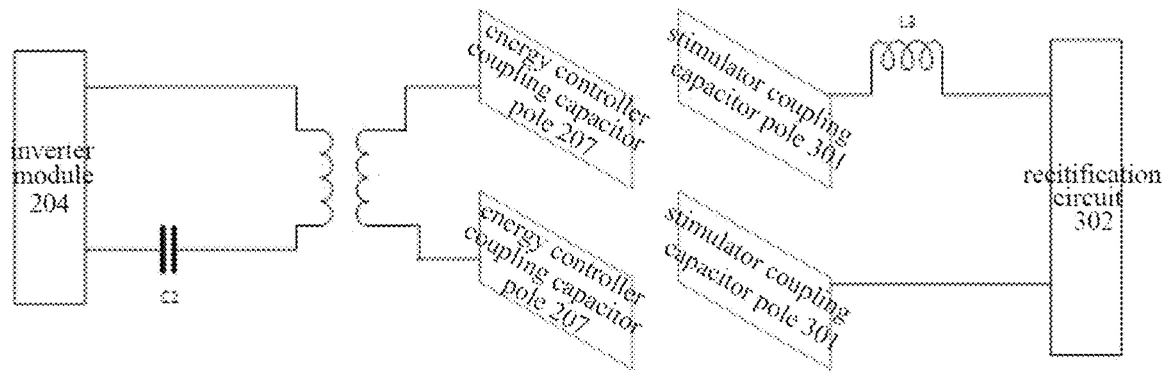
FIG. 9 shows a third embodiment of a compensation resonant network.

Scheme 2 is the LCL compensation network topology, as shown in FIG. 8. Scheme 2 can effectively compensate for reactive power while also transforming the impedance characteristics of the system to improve the problem of resonance frequency drift of the system.

Scheme 3 is a scheme of a compensation resonant network with a relay coil, in which the energy controller coupling capacitor pole 207 generates strong resonance with the secondary winding of the relay coil, which can increase the performance of the maximum transmission power of the system.

After passing through the equivalent capacitance between the energy controller coupling capacitor pole 207 and the stimulator coupling capacitor pole 301, electrical energy can be transmitted to the rectification circuit 302 of the in-vivo nerve electrostimulator 03, which converts the high-frequency alternating current energy into direct current energy for use by the in-vivo nerve electrostimulator 03.

Communication Implementation Procedure

For an optional scheme in which the main control chip 306 of the in-vivo nerve electrostimulator 03 integrates a Bluetooth module, communication can be achieved through the Bluetooth transmission protocol, so it will not be elaborated here. The following introduces an implementation scheme using a harmonic communication module.

In the scheme of using harmonics for communication, when the in-vitro energy controller 02 transmits data to the in-vivo nerve electrostimulator 03, the energy controller control unit 201 controls the energy controller harmonic communication module 205 to generate an A-th harmonic equivalent to A times of the output frequency of the inverter module 204, and modulates the information into the A-th harmonic, which modulating may use an ASK way. The A-th harmonic enters the in-vivo nerve electrostimulator 03 through coupling of the stimulator coupling capacitor pole 301 and the energy controller coupling capacitor pole 207.

The stimulator harmonic communication module 303 of the in-vivo nerve electrostimulator 03 is configured with a filter circuit sensitive to the A-th harmonic. After being extracted by the filter circuit, the information is transmitted to the main control chip 306 for processing.

When the in-vitro energy controller 02 needs to read data of the in-vivo nerve electrostimulator 03, the in-vitro energy controller 02 controls the energy controller harmonic communication module 205 to generate the B-th harmonic, which is transmitted to the energy controller coupling capacitor pole 207.

The B-th harmonic can be transmitted to the in-vivo nerve electrostimulator 03 through the capacitive coupling between the energy controller coupling capacitor pole 207 and the stimulator coupling capacitor pole 301. The main control chip 306 controls the stimulator harmonic communication module 303 to modulate the impedance of the B-th harmonic, and transmits data to the in-vitro energy controller 02 in a manner of impedance modulation. The energy controller harmonic communication module 205 in the in-vitro energy controller 02 measures the equivalent impedance value of the system under the B-th harmonic, in order to obtain feedback data of the in-vivo nerve electrostimulator 03.

The A-th harmonic and B-th harmonic may have different harmonic orders or same harmonic order. They may be a fixed harmonic order or a real-time changing harmonic order. And they may be digital modulation or analog modulation.

Power On Authentication Process of Main Control Chip

Figure 10:
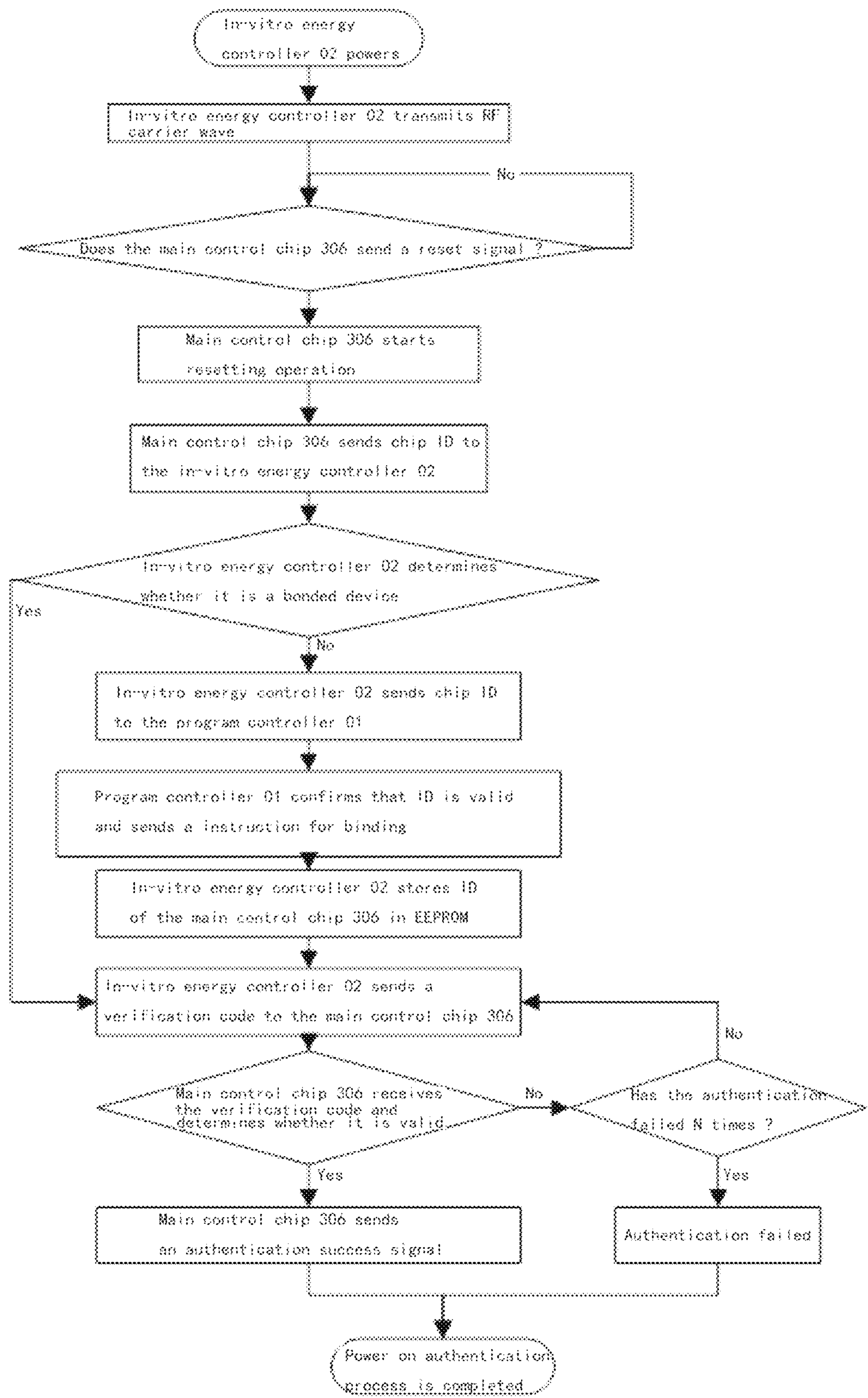
FIG. 10 shows a power on and authentication process of a main control chip.
Figure 11:
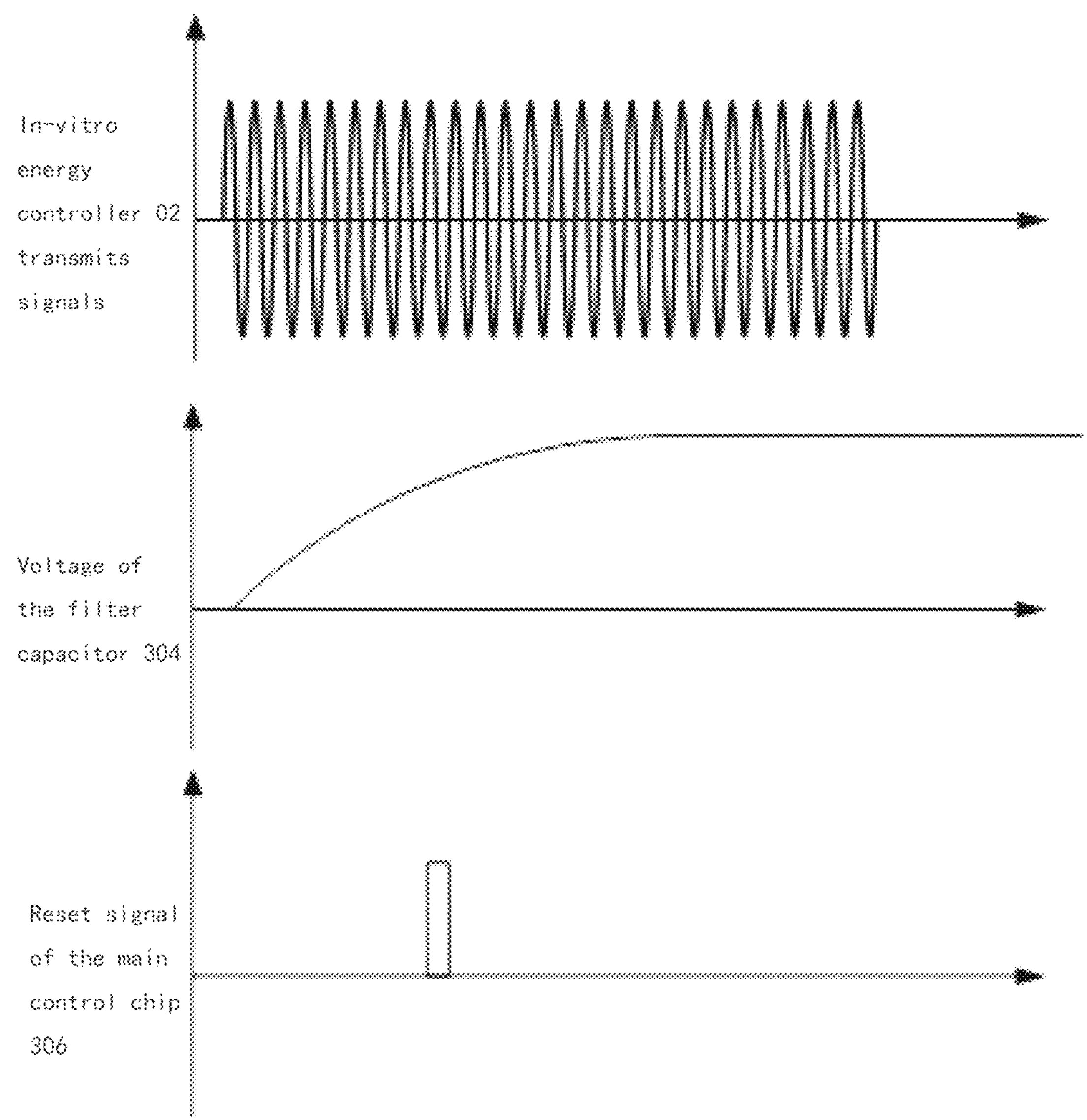
FIG. 11 shows a power on and reset waveform of a main control chip.

As shown in FIG. 10, firstly, the in-vitro energy controller 02 performs energy transmission through the capacitive coupling between the energy controller coupling capacitor pole 207 and the stimulator coupling capacitor pole 301, and waits for the main control chip 306 in the in-vivo nerve electrostimulator 03 to be powered on and reset. After the internal circuit of the in-vivo nerve electrostimulator 03 reaches the specified voltage on the filter capacitor 304, a reset signal is generated, and the main control chip 306 starts working and feeds back on chip ID (i.e. chip identification) to outside. The power on and reset signals are shown in FIG. 11.

When the in-vitro energy controller 02 receives the chip ID information for the first time, it transmits the information to the program controller 01 for confirmation, and records the chip ID in the EEROM memory to achieve device binding. After device binding, the program controller 01 is no longer required to participate in authentication again.

Impedance Measurement Process

Figure 12:
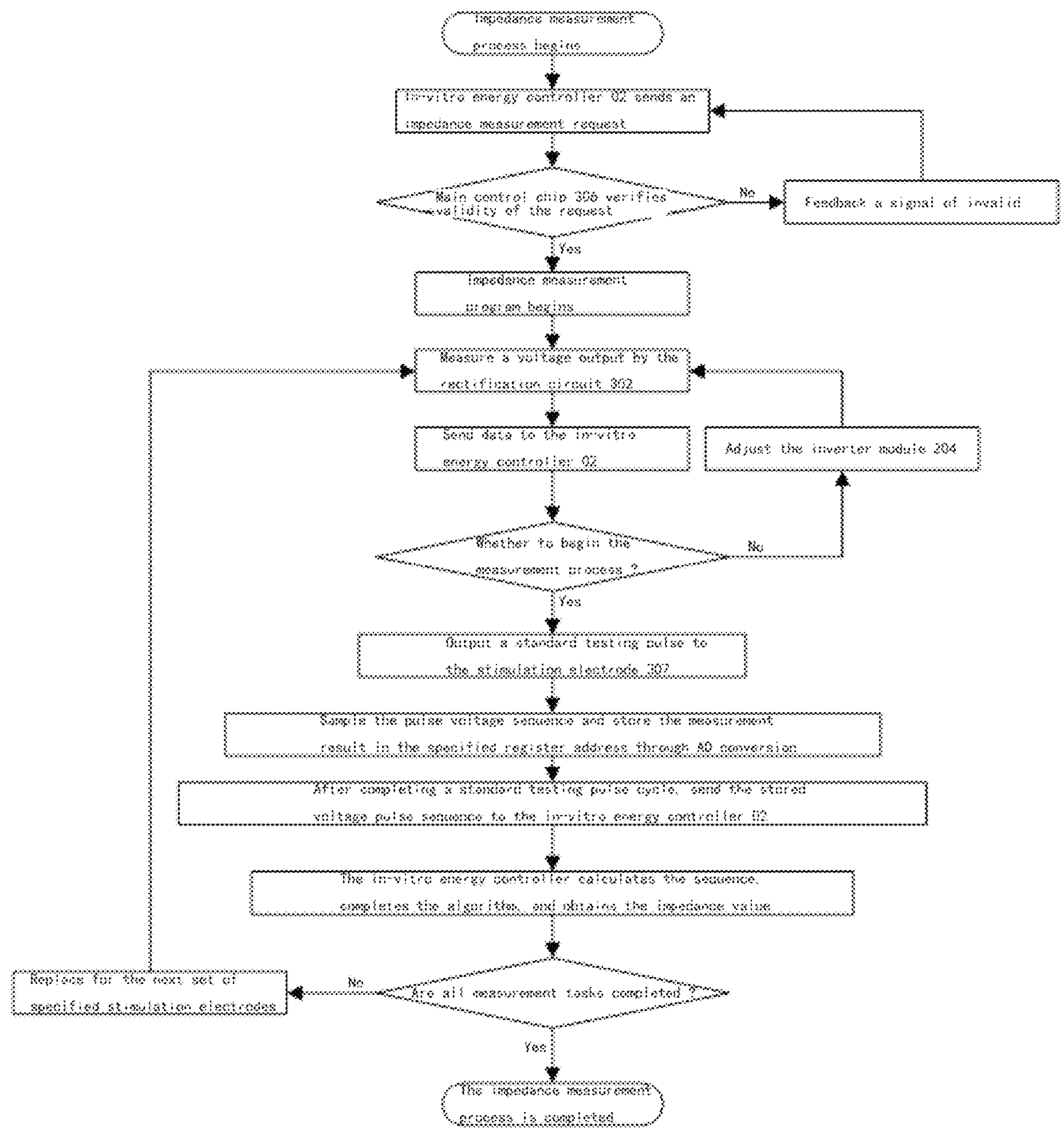
FIG. 12 shows an impedance measurement flowchart.

The in-vitro energy controller 02 makes a impedance measurement request to the in-vivo nerve electrostimulator 03 and sends a key. After receiving the request, the main control chip 306 of the in-vivo nerve electrostimulator 03 first verifies validity of the key, and then begins the impedance measurement program. The measurement procedure is shown in FIG. 12.

The main control chip 306 firstly measures a voltage value output by the rectification circuit and sends this voltage value to the in-vitro energy controller 02. The in-vitro energy controller 02 determines whether to perform adjustment based on the voltage value (FIG. 12 shows adjusting the inverter module), or whether to start the impedance measurement process. After receiving an instruction from the in-vitro energy controller to start the measurement process, the main control chip 306 controls loading of current pulses with standard amplitude and duration onto a certain electrode combination according to the standard testing program, and measures the voltage between an emitting electrode and a returning electrode. After AD conversion, the measured value is stored in the designated storage space inside the main control chip 306. After one electrostimulation pulse cycle, the measurement data is transmitted to the in-vitro energy controller 02. After the data is received and passes through verification, the in-vitro energy controller 02 transmits the data to the program controller 01 and transmits a confirmation information to the in-vivo nerve electrostimulator 03. After receiving the confirmation information, the in-vivo nerve electrostimulator 03 begins an impedance testing process for the next set of electrodes.

The so-called "electrode combination" refers to a set of electrodes of the same polarity, including an emitting electrode set (the electrode polarity in this set is positive), a returning electrode set (the electrode polarity in this set is negative), and a vacant electrode set (the electrode polarity in this set is 0). By distributing electrode polarity, various electrode combinations can be formed.

This cycle is repeated until all impedance measurement programs are completed. All data is finally summarized in the program controller 01 for storage and calculation, and all inter-electrode impedance that need to be measured are calculated.

Electrostimulation Implementation Process

Figure 13:
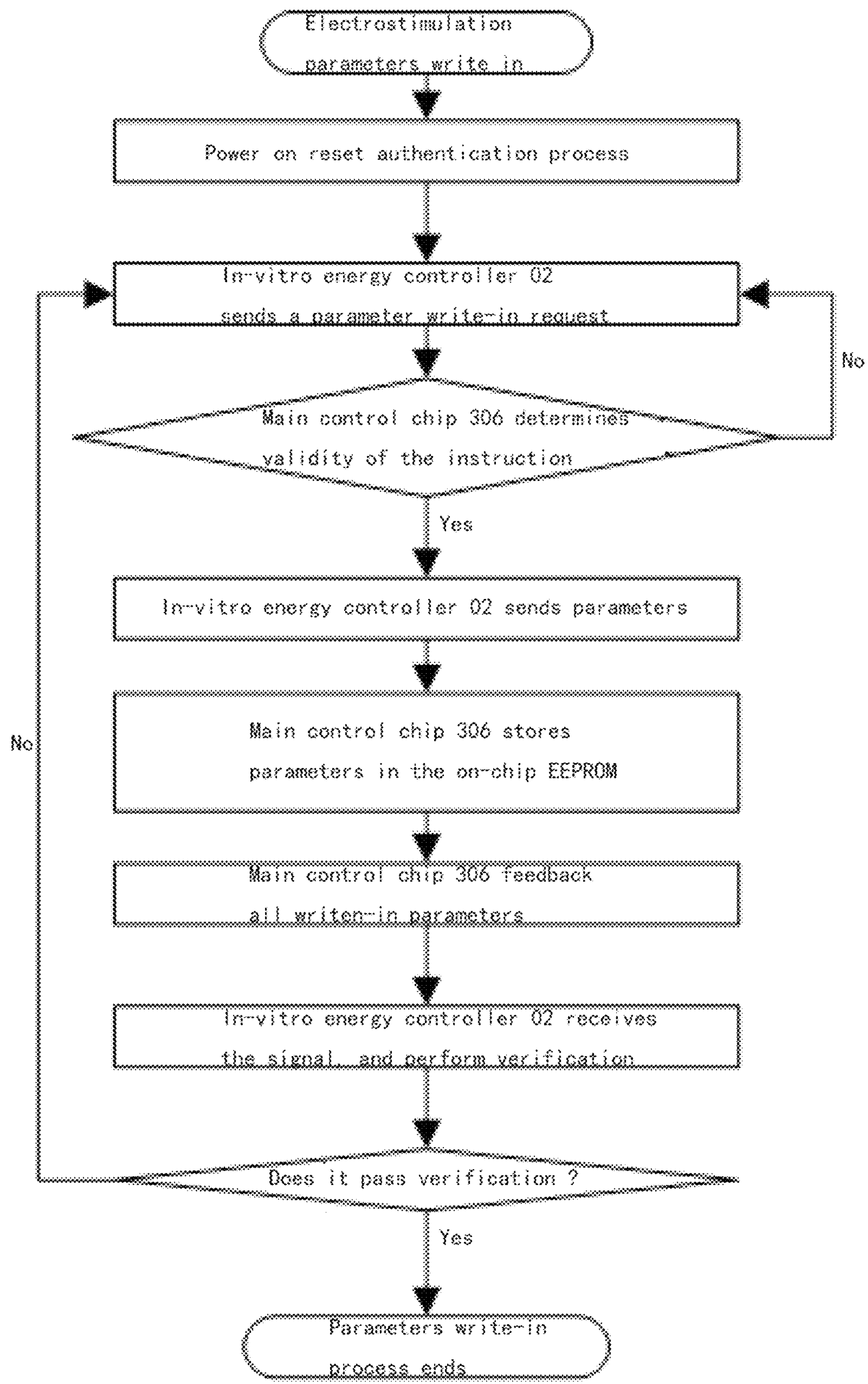
FIG. 13 shows a flowchart of a writing process of electrostimulation parameters.
Figure 14:
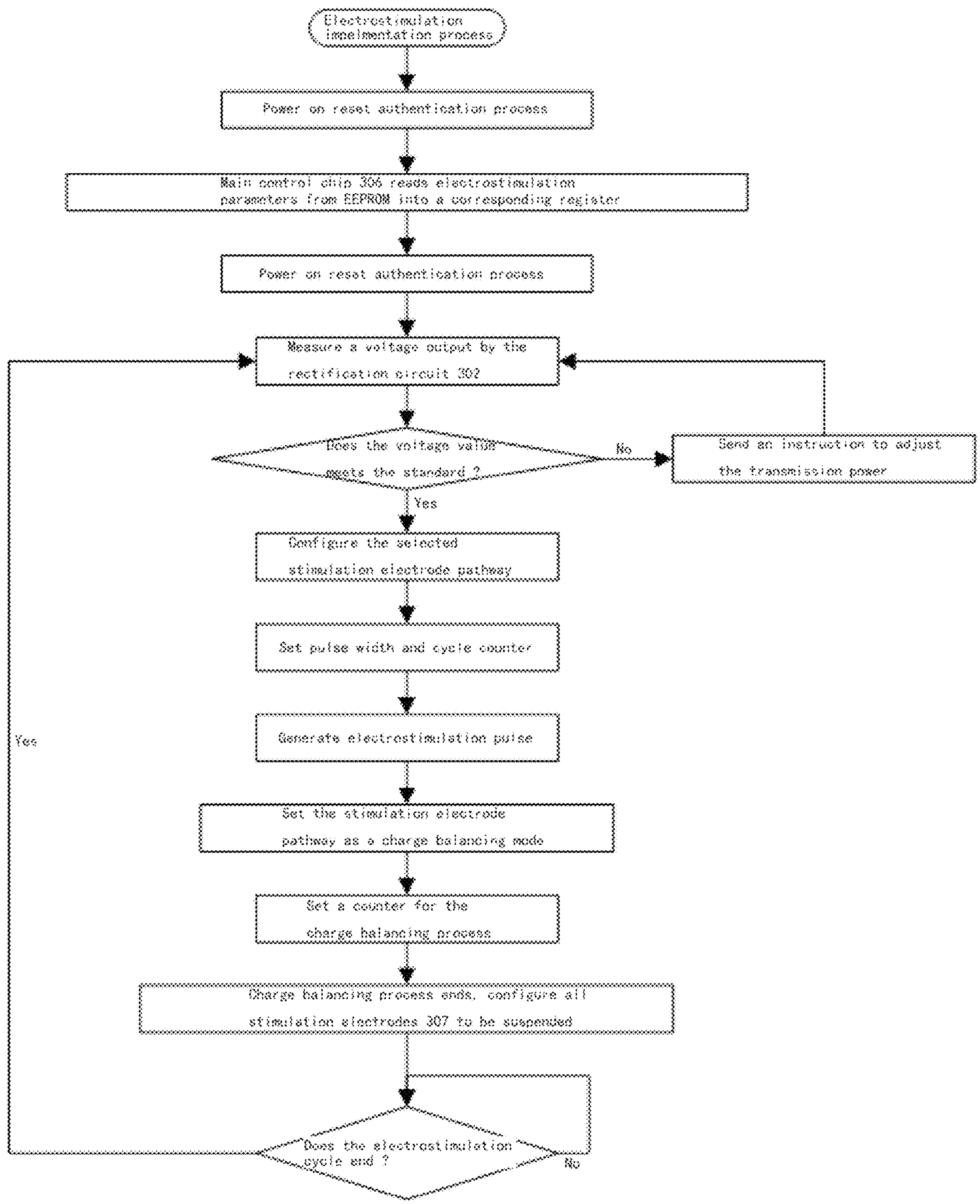
FIG. 14 shows a flowchart of implementation of electrostimulation.
Figure 15:
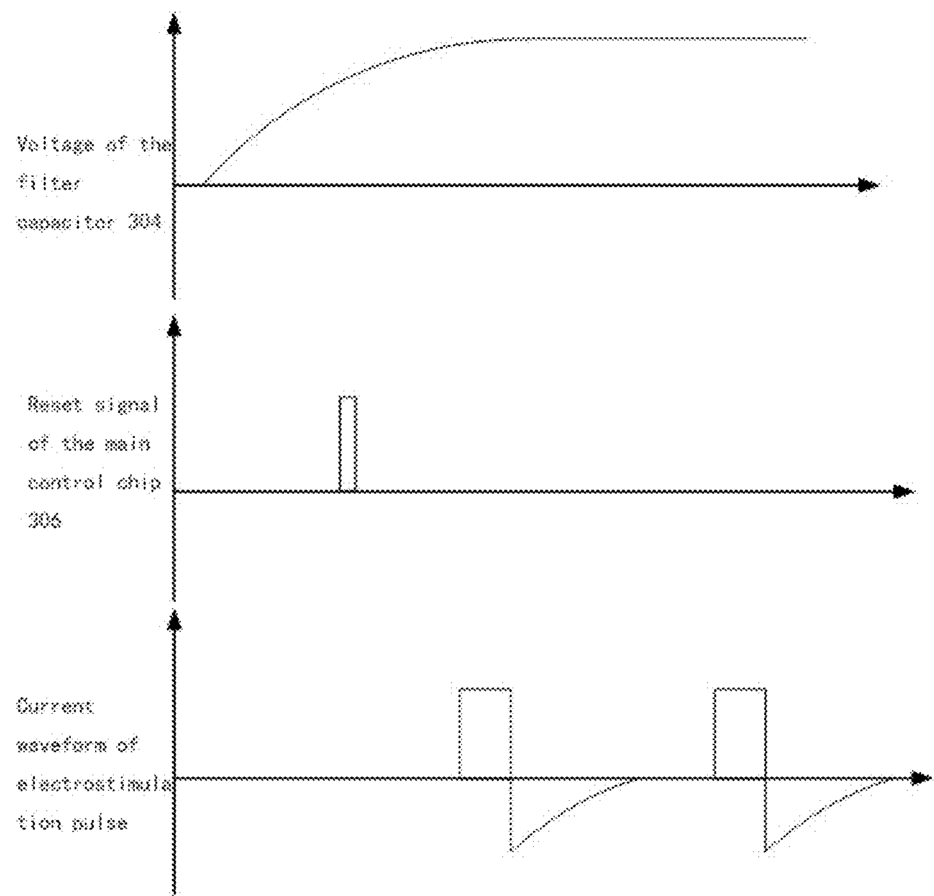
FIG. 15 shows a first type of electrostimulation waveform I.
Figure 16:
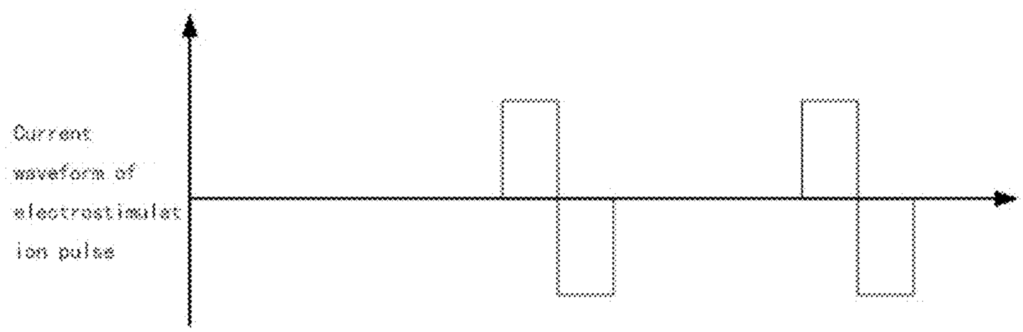
FIG. 16 shows a second type of electrostimulation waveform II.
Figure 17:
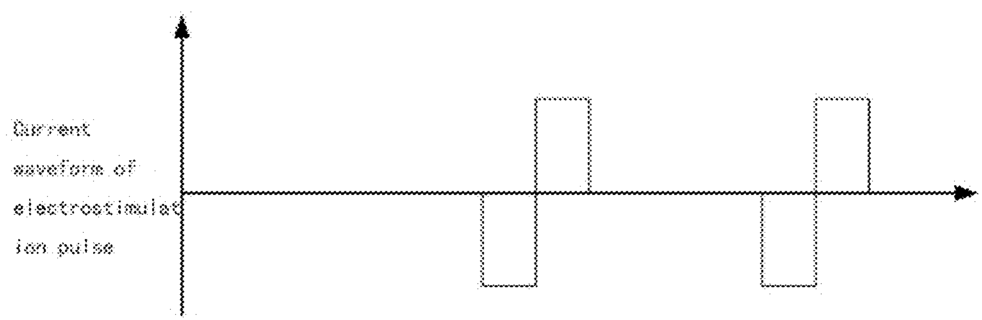
FIG. 17 shows a third type of electrostimulation waveform III.
Figure 18:
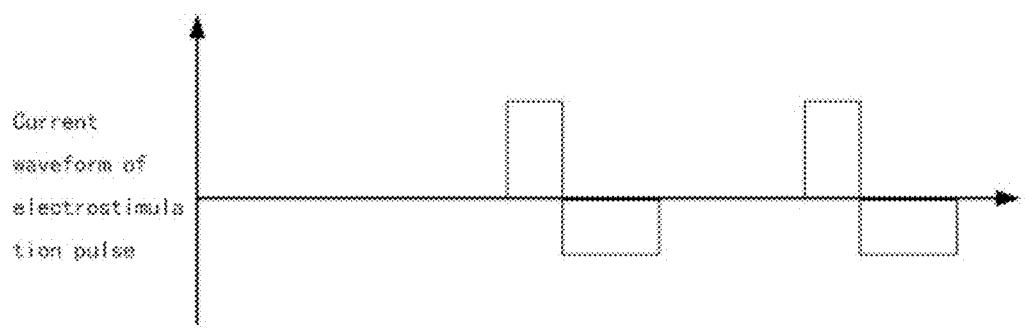
FIG. 18 shows a fourth type of electrostimulation waveform IV.
Figure 19:
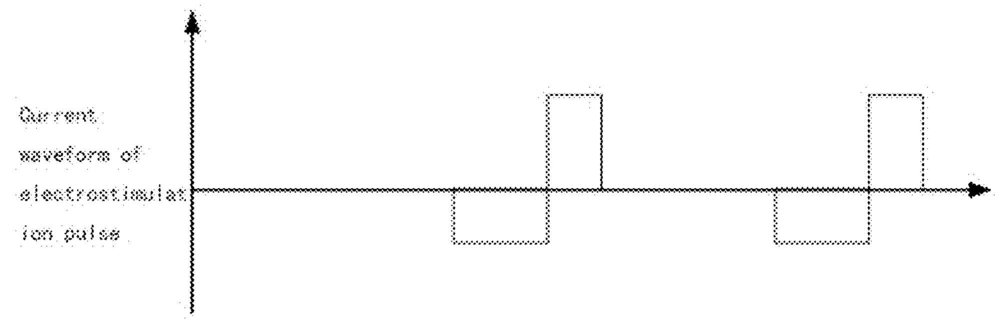
FIG. 19 shows a fifth type of electrostimulation waveform V.

FIG. 13 shows a writing process of electrostimulation parameters. Through this process, the program controller 01 including an upper computer control APP writes electrostimulation parameters into the in-vivo nerve electrostimulator 03 just through the in-vitro energy controller 02. All required parameters for electrostimulation will be stored in the memory of the in-vivo nerve electrostimulator 03 for a long time.

No active control is required from an external transmitter during the implementation of conventional electrostimulation. Detailed implementations are as follows.

Firstly, the power on authentication process proceeds. After the power on authentication is completed, the in-vivo nerve electrostimulator 03 will generate a required current source pulse stimulation signals according to the stored electrostimulation parameters, and load the stimulation signal onto the corresponding electrodes. Then the actual stimulation current is measured and the measured value is stored in a corresponding position of the data memory of the chip. After implementation of one electrostimulation pulse, a charge balancing process is carried out to restore the net charge on the electrode to 0, which may be divided into two types: an active charge balancing process and a passive charge balancing process. The waveforms of the electrostimulation implemented may be waveforms as shown in FIGS. 15, 16, 17, 18, and 19, but are not limited to the above waveforms. Through internal control of the chip, as long as the net charge of the electrostimulation waveform at a single electrode end is zero, any shape of electrostimulation waveform may be output.

When the charge balancing process ends, waiting for the end of the entire pulse cycle, then implementation of a complete pulse stimulation process is finished.

The main control chip 306 confirms the required direct current voltage value based on feedback and compares it with the actual direct current rectification voltage value output by the rectification circuit 302.

When the rectification voltage value is insufficient, the main control chip 306 sends a request to the in-vitro energy controller 02 to increase the transmission power level. When the rectification voltage value is too high, the main control chip 306 sends a request to the in-vitro energy controller 02 to decrease the transmission power.

The in-vitro energy controller 02 adjusts the transmission power based on the received request.

Patient Manual Adjustment Mode

Figure 20:
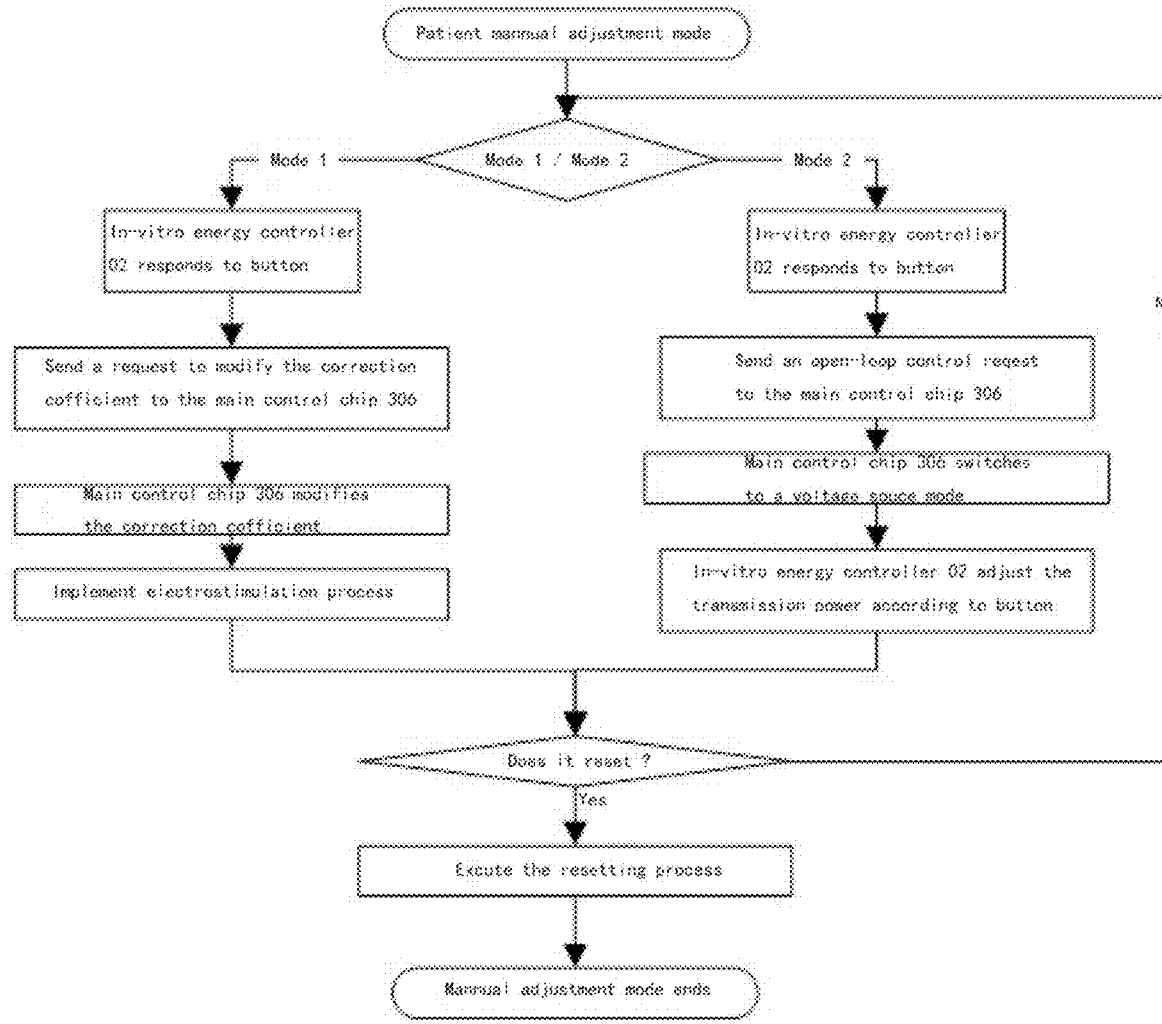
FIG. 20 shows a flowchart of manual adjustment mode.

This system provides a patient manual adjustment mode, and a patient can switch to the manual adjustment mode at any time according to personal feeling. The manual adjustment mode has two implementation methods, as shown in FIG. 20.

Implementation Method 1: A Correction Coefficient Type of Manual Adjustment

In the implementation method 1, the patient manually adjusts a customized digital correction amount on the in-vitro energy controller 02. The in-vitro energy controller 02 sends the digital correction amount to the RAM of the in-vivo nerve electrostimulator 03. The in-vivo nerve electrostimulator 03 adds the correction amount to the originally stored electrostimulation amplitude parameter, and then outputs a corrected amplitude of electrostimulation pulse.

Implementation Method 2: Open Loop Control Mode

In the implementation method 2, the patient adjusts the transmission power of the in-vitro energy controller 02. The in-vivo nerve electrostimulator 03 switches to a voltage source type of stimulation pulse mode. In this mode, the cycle, frequency, and corresponding electrode configuration of the electrostimulation pulse remain unchanged. However, the amplitude of the direct current voltage output by the rectification circuit 302 is directly loaded onto both ends of the electrode for stimulation. Therefore, the amplitude of the stimulation is controlled by the transmission power of the in-vitro energy controller 02. At this time, the control is an open-loop control, and the amplitude of the stimulation is completely adjusted manually by the patient.

New Device Debugging

Figure 21:
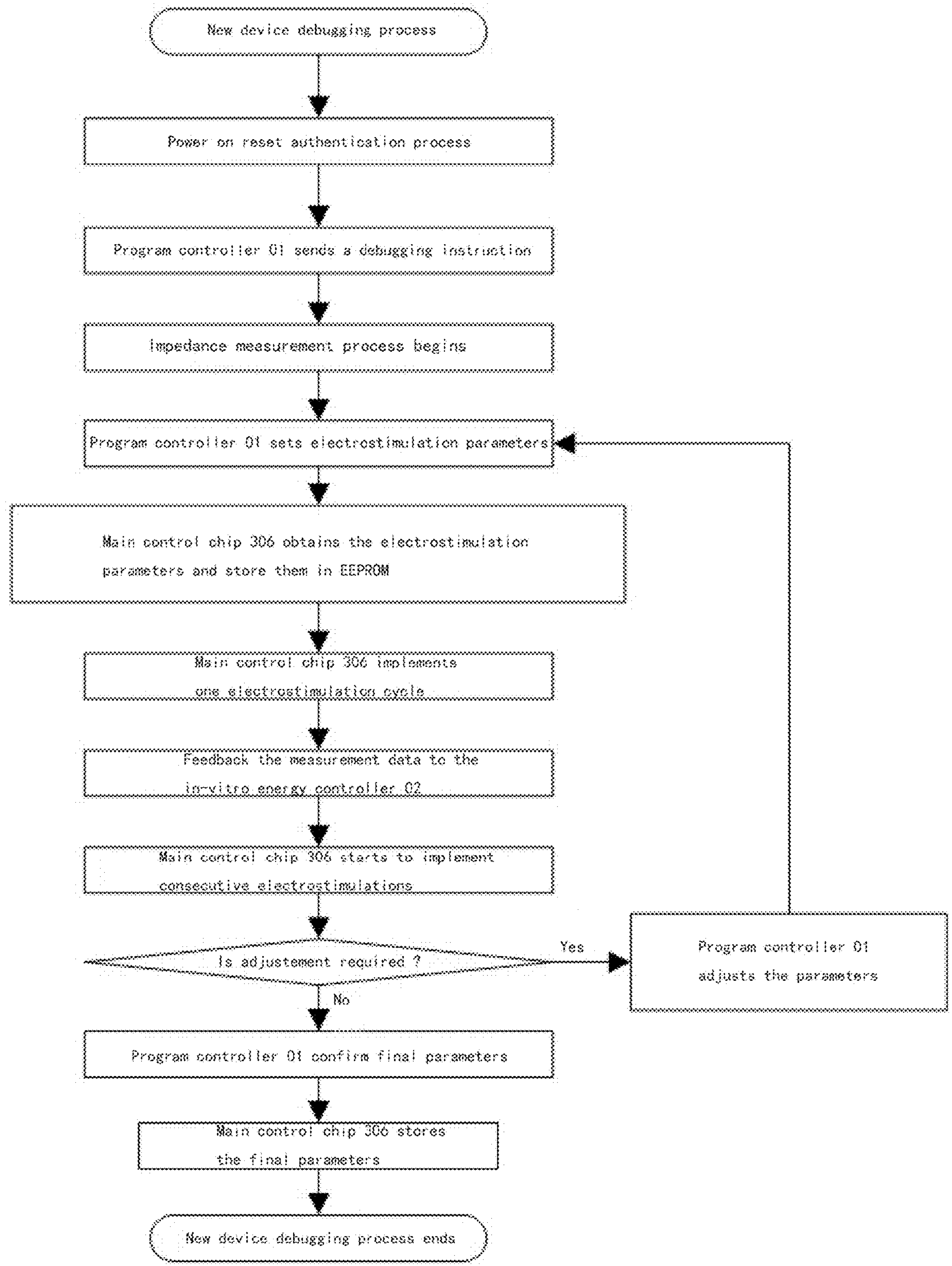
FIG. 21 shows a flowchart of debugging a new device.

FIG. 21 shows a flowchart of debugging a new device.

Controlled by the program controller 01, the program controller 01 sends a debugging instruction to the in-vitro energy controller 02 through Bluetooth. The in-vitro energy controller 02 starts to perform debugging operations, as shown in FIG. 21.

The in-vitro energy controller 02 is preferred to start the power on authentication process at first.

After confirming the validity of the chip ID, the in-vitro energy controller 02 transmits a device debugging instruction to the in-vivo nerve electrostimulator 03. After receiving the instruction, the in-vivo nerve electrostimulator 03 begins an impedance measurement program between various electrodes.

After the impedance measurement is completed, the program controller 01 sets the electrostimulation parameters and transmits the parameter information to the in-vivo nerve electrostimulator 03 through the in-vitro energy controller 02. After receiving the electrostimulation parameters, the in-vivo nerve electrostimulator 03 stores all parameters into the internal EEPROM.

After storing the parameters, the main control chip 306 begins the following electrostimulation testing process based on the parameters:

Firstly, the main control chip 306 implements several sets of electrostimulation pulses based on the electrostimulation parameters and completes necessary measurement tasks, namely measuring the inter-electrode voltages. After the stimulation is completed, the measurement data is transmitted to the program controller 01 including an upper computer APP through the in-vitro energy controller 02. Then the electrostimulation pulses continue to be transmitted until next instruction is received or the timer exceeds the limit.

Then, the program controller 01 including an upper computer APP adjusts the stimulation parameters based on the measurement data and patient experience, and performs the above electrostimulation testing process again. This process is repeated until all electrostimulation parameters are confirmed.

Finally, the program controller 01 including an upper computer control APP transmits the finally confirmed parameters to the in-vivo nerve electrostimulator 03 for storage through the in-vitro energy controller 02.

Abnormal Stimulation Current Processing I

In the conventional implementation process of electrostimulation, a controllable current source circuit is used to generate electrostimulation pulses. If the actually measured current cannot reach the theoretical control value any way, it belongs to an abnormal situation of excessive low current and needs to be dealt with. This is usually caused by factors such as insufficient amplitude of the rectification voltage output by the rectification circuit 302, or changes in electrode impedance.

The main control chip 306 firstly checks the amplitude of the rectification voltage based on the abnormality processing program. If the amplitude of the rectification voltage is insufficient, a request to increase the transmission power is sent to the in-vitro energy controller 02. If the amplitude of the rectification voltage is still insufficient after N (a reasonable value) consecutive requests are sent, a fault code is transmitted and the in-vitro energy controller 02 takes over for processing. If the amplitude of the rectification voltage is normal, or returns to normal after several requests, then the impedance measurement program is activated.

The impedance measurement program is performed and the measured impedance is compared with the originally recorded impedance value. If an abnormality occurs, a fault code is transmitted to the in-vitro energy controller 02. If there is no abnormality, the conventional electrostimulation program is tried again.

If the abnormal stimulation current disappears, the processing is completed. If the abnormal stimulation current still exists after two rounds of the above processing flow, it may be due to a malfunction in the in-vivo electrostimulation itself, then a fault code is transmitted to the in-vitro electrostimulator and the device halts.

Abnormal Stimulation Current Processing II

During some implementation processes of electrostimulation, abnormality of overhigh current may occur. Due to use of a current source circuit, which has the ability to suppress overhigh current, abnormality of overhigh current usually indicates chip failure. The processing way is to report a fault code to the in-vitro energy controller 02 and the device halts.

Abnormal Output Voltage of RF Rectification Circuit

If the voltage amplitude is significantly insufficient, please refer to the processing way for insufficient voltage amplitude in the "Patient Manual Adjustment" part. This situation does not fall within the scope of abnormal situations in this item.

If the voltage amplitude is significantly too high, an unknown interference source may appear. At this point, the main control chip 306 sends a fault code and performs short-circuit or impedance switching operation on the antenna, or changes the antenna structure to suppress overhigh voltage to protect the in-vivo nerve electrostimulator 03.

Charge Balancing Method

This system adopts a combination of active and passive charge balancing ways.

A set of capacitors are connected in series between the interface circuit of the main control chip 306 and the stimulation electrode 307, which are balance capacitors 308. The balance capacitors 308 can ensure that the static charge on each electrode is zero. If the static charge on an electrode is not zero, the main control chip 306 will control the interface circuit to provide a discharge circuit for the balance capacitors 308. The capacitor discharging process will automatically achieve charge balance for each electrode.

When the frequency of the electrostimulation pulses is lower, the time period between two electrostimulation pulses is usually longer, which allows the balance capacitor to fully discharge and complete a passive charge balance.

When the frequency of the electrostimulation pulses is higher, the time period between two pulses may not be sufficient for the capacitor to fully discharge, so an active charge balance is required. That is, after implementing an electrostimulation pulse, all configured electrodes are reversed (the emitting electrode becomes the returning electrode, the returning electrode becomes the emitting electrode, and the vacant electrode remains unchanged), and then an electrostimulation pulse having the same amplitude is implemented again. It is equivalent to immediately implementing a same pulse having negative polarity after implementing a positive pulse on the electrode.

The active charge balancing method can also be applied in reverse, that is, implementing a reverse pulse first and then immediately implementing a positive pulse. This implementation way can output an electrostimulation pulse with a higher current amplitude that could not be output in the past.

For convenience of interpretation and precise limitation of the accompanying claims, the terms "up", "down", "inside", and "outside" are used to describe the features of exemplary embodiments by referring to the positions of these features shown in the drawings.

The aforementioned description of the specific exemplary embodiments of the present invention is for the purpose of illustration and exemplification. These descriptions are not intended to exhaust the present invention or limit it to the precise form disclosed, and it is evident that many changes and variations can be made based on the above teachings. The purpose of selecting and describing exemplary embodiments is to explain the specific principles and practical applications of the present invention, so that other technical personnel in the art can implement and utilize various exemplary embodiments of the present invention, as well as various choices and changes. The scope of the present invention is intended to be limited by the accompanying claims and their equivalent forms.

The invention claimed is:

1. An in-vivo nerve electrostimulator comprising: two stimulator coupling capacitor pole for coupling with an energy control coupling capacitor pole of an in-vitro energy control thereby receiving electrical energy from the in-vitro energy controller and achieving information exchange; a stimulator compensation resonant network connected to the two stimulator coupling capacitor poles; a rectification circuit connected to the stimulator compensation resonant network, wherein one of the two simulator coupling capacitor poles is connected to the rectification circuit through a stimulator compensation inductor and another one of the two stimulator coupling capacitor poles directly connected to the rectification circuit, wherein the rectification circuit converts alternating current into rectified direct current energy; a filter capacitor connected to the rectification circuit for direct current filtering the rectified direct current energy; a main control chip that controls operation of the in-vivo nerve electrostimulator, connected to the rectification circuit and the filter capacitor and receiving power supply therefrom; a stimulator harmonic communication module connected between at least one of the two stimulator coupling capacitor pole and the main control chip for modulating and demodulating communication information; a plurality of sets of stimulation electrodes and corresponding balance capacitors, wherein each balance capacitor is connected between the main control chip and a corresponding stimulation electrode, receives stimulation pulses from the main control chip and applies them to the corresponding stimulation electrode, and achieves charge balance.

2. The in-vivo nerve electrostimulator according to claim 1, wherein the stimulator harmonic communication module comprises a filter circuit sensitive to A-th harmonic, thereby extracting information from the A-th harmonic of a received signal and transmitting the information to the main control chip.

3. The in-vivo nerve electrostimulator according to claim 2, wherein the stimulator harmonic communication module also comprises a filter circuit sensitive to B-th harmonic, thereby extracting the B-th harmonic from the received signal, and the main control chip controls the stimulator harmonic communication module to modulate impedance of the B-th harmonic, and impedance modulated data is transmitted to the in-vitro energy controller by the stimulator coupling capacitor pole.

4. The in-vivo nerve electrostimulator according to claim 3, wherein B is equal to A.

5. An in-vitro energy controller for transmitting electrical energy to and communicating with an in-vivo nerve electrostimulator, comprising: a battery module for supplying power to the in-vitro energy controller; an energy controller control unit for controlling operation of the in-vitro energy controller; an upper computer communication module connected to the energy controller control unit which communicates with a program controller through the upper computer communication module; a storage module for storing electrical stimulation signals and connected to the energy controller control unit; inverter module connected to the battery module and the energy controller control unit for converting direct current supplied by the battery module into alternating current; an energy controller compensation resonant network connected to the inverter module to compensate for reactive power of the system, two energy controller coupling capacitor pole connected to an output end of the energy controller compensation resonant network, wherein the energy controller compensation resonant network forms a serial inductance compensation network as follows: one of the two energy controller coupling capacitor poles is connected to the inverter module through a first energy controller compensation inductor, and another one of the two energy controller coupling capacitor poles is directly connected to the inverter module; an energy controller harmonic communication module powered by the battery module and bridged between the energy controller control unit and the energy controller coupling capacitor pole for modulating and demodulating communication information; and a button and display module comprising a button for inputting an operation instruction and a display screen for displaying input content and information about the operation of the in-vivo nerve electrostimulator.

6. The in-vitro energy controller according to claim 5, wherein the energy controller compensation resonant network forms an LCL compensation network topology as follows: one of the two energy controller coupling capacitor poles is connected in series to the inverter module through one first energy controller compensation inductor and another first energy controller compensation inductor; the other one of the two energy controller coupling capacitor poles is directly connected to the inverter module to form a connection point, which is connected to a common connection end of the first energy controller compensation inductor and the first energy controller compensation inductor through a first energy controller compensation capacitor.

7. The in-vitro energy controller according to claim 5, wherein the energy controller compensation resonant network forms a compensation resonant network structure having a relay coil as follows: a primary winding having one end connected to a first output end of the inverter module and another end connected to a second output end of the inverter module through a second energy controller compensation capacitor; and a secondary winding having one end connected to one of the energy controller coupling capacitor poles and another end connected to the other one of the energy controller coupling capacitor poles.

8. The in-vitro energy controller according to claim 5, wherein the energy controller control unit controls the energy controller harmonic communication module to generate an A-th harmonic equivalent to A times of an output frequency of the inverter module and modulates information into the A-th harmonic.

9. The in-vitro energy controller according to claim 8, wherein the energy controller control unit controls the energy controller harmonic communication module o generate a B-th harmonic equivalent to B times of the output frequency of the inverter module, and transmits the harmonic to the capacitor poles.

10. The in-vitro energy controller according to claim 9, wherein B is equal to A.

11. The in-vitro energy controller according to The in-vitro energy controller according to wherein the upper computer communication module is a BLUETOOTH module or a WiFi module.

12. A nerve electrostimulation system using capacitive coupling energy transmission, comprising: an in-vivo nerve electrostimulator; and an in-vitro energy controller for transmitting electrical energy to and communicating with the in-vivo nerve electrostimulator, wherein the in-vivo nerve electrostimulator comprises: two stimulator coupling capacitor pole for coupling with an energy controller coupling capacitor pole of the in-vitro energy controller and receiving electrical energy from the in-vitro energy controller and exchange information; a stimulator compensation resonant network connected to the two stimulator coupling capacitor poles; a rectification circuit connected to the stimulator compensation resonant network, wherein one of the two stimulator coupling capacitor poles is connected to the rectification circuit through a stimulator compensation inductor and another one of the two stimulator coupling capacitor poles is directly connected to the rectification circuit, wherein the rectification circuit converts alternating current energy into rectified direct current energy; a filter capacitor connected to the rectification circuit for filtering direct current into the rectified direct current energy; a main control chip that controls operation of the in-vivo nerve electrostimulator, connected to the rectification circuit and the filter capacitor and receiving power supply there from; a stimulator harmonic communication module connected between at least one of the two stimulator coupling capacitor poles and the main control chip for modulating and demodulating communication information; a plurality of sets of stimulation electrodes and corresponding balance capacitors, wherein each balance capacitor is connected between the main control chip and a corresponding stimulation electrode, receives stimulation pulses from the main control chip and applies them to the corresponding stimulation electrode, and achieves charge balance; and wherein the in-vitro energy controller comprises: a battery module for supplying power to the in-vitro energy controller; an energy controller control unit for controlling the operation of the in-vitro energy controller; an upper computer communication module connected to the energy controller control unit which communicates with a program controller through the upper computer communication module; a storage module for storing electrical stimulation signals and connected to the energy controller control unit; an inverter module connected to the battery module and the energy controller control unit for converting direct current supplied by the battery module into alternating current; an energy controller compensation resonant network connected to the inverter module to compensate for reactive power of the system, at least one energy controller coupling capacitor pole connected to an output end of the energy controller compensation resonant network; an energy controller harmonic communication module powered by the battery module and bridged between the energy controller control unit and the energy controller coupling capacitor pole for modulating and demodulating communication information; and a button and display module comprising a button for inputting an operation instruction and a display screen for displaying input content and information about the operation of the in-vivo nerve electrostimulator.

13. The nerve electrostimulation system using capacitive coupling energy transmission according to claim 12, wherein the program controller includes a program controller communication module for communicating with the in-vitro energy controller and an upper computer control for achieving human-machine interaction control to the in-vitro energy controller and the in-vivo nerve electrostimulator.

14. The nerve electrostimulation system using capacitive coupling energy transmission according to claim 13, wherein the program controller communication module includes one of a BLUETOOTH module or a WiFi module.

15. The nerve electrostimulation system according to claim 12, wherein the stimulator harmonic communication module comprises a filter circuit sensitive to A-th harmonic, thereby extracting information from the A-th harmonic of the received signal and transmitting the information to the main control chip.

16. The nerve electrostimulation system according to claim 15, wherein the stimulator harmonic communication module also comprises a filter circuit sensitive to B-th harmonic, thereby extracting the B-th harmonic from the received signal, and the main control chip controls the stimulator harmonic communication module to modulate impedance of the B-th harmonic, and impedance modulated data is transmitted to the in-vitro energy controller by the stimulator coupling capacitor pole.

17. The nerve electrostimulation system according to claim 12, further comprising two energy controller coupling capacitor poles, wherein the energy controller compensation resonant network forms a serial inductance compensation network as follows: one of the two energy controller coupling capacitor poles is connected to the inverter module through a first energy controller compensation inductor, and the other one of the two energy controller coupling capacitor poles is directly connected to the inverter module.

* * * * *